United States Patent [19]

Kumagai et al.

[11] Patent Number: 5,701,177
[45] Date of Patent: Dec. 23, 1997

[54] METHOD FOR DETECTING FAULT OF OPTICAL FIBER GYRO AND APPARATUS FOR DIAGNOSING FAULT OF THE SAME

[75] Inventors: Tatsuya Kumagai, Hitachi; Hiroshi Kajioka, Ibaraki-ken; Osamu Kobayashi; Munehiro Akiyama, both of Hitachi; Shigeru Oho; Hisao Sonobe, both of Katsuta, all of Japan

[73] Assignees: Hitachi Cable, Ltd.; Hitachi, Ltd., both of Tokyo, Japan

[21] Appl. No.: 795,293

[22] Filed: Feb. 4, 1997

Related U.S. Application Data

[63] Continuation of Ser. No. 340,833, Nov. 16, 1994, abandoned.

[30] Foreign Application Priority Data

Nov. 16, 1993 [JP] Japan .................. 5-286368

[51] Int. Cl.$^6$ ............................ G01C 19/64
[52] U.S. Cl. ................................... 356/350
[58] Field of Search ........................ 356/350

[56] References Cited

U.S. PATENT DOCUMENTS

| | | | |
|---|---|---|---|
| 5,080,489 | 1/1992 | Nishikawa et al. | 356/350 |
| 5,108,181 | 4/1992 | Nakagami et al. | 356/350 |
| 5,386,290 | 1/1995 | Okada | 356/350 |
| 5,412,472 | 5/1995 | Okada et al. | 356/350 |

FOREIGN PATENT DOCUMENTS

| | | | |
|---|---|---|---|
| 63-128225 | 5/1988 | Japan . | |
| 2231402 | 11/1990 | United Kingdom | 356/350 |

*Primary Examiner*—Vincent P. McGraw
*Attorney, Agent, or Firm*—Helfgott & Karas, P.C.

[57] ABSTRACT

A phase modulated light is propagated through an optical fiber sensing loop, from which a propagated light is obtained. The propagated light is converted to an electric signal, from which a fundamental wave component and even number harmonic wave components of a phase modulating signal for the phase modulated signal are detected. In accordance with the changes of the fundamental and even number harmonic wave components, fault is detected. On the other hand, the electric signal may be integrated to provide an integrated signal. In accordance with the comparison between the integrated signal and a fault reference voltage, the fault may be detected.

14 Claims, 5 Drawing Sheets

METHOD FOR DETECTING FAULT OF OPTICAL FIBER GYRO AND APPARATUS FOR DIAGNOSING FAULT OF THE SAME

This is a continuation of application Ser. No. 08/340,833, filed Nov. 16, 1994, now abandoned.

FIELD OF THE INVENTION

The invention relates to a method for detecting fault of an optical fiber gyro and an apparatus for diagnosing fault of the same, and more particularly to, the detection of fault in an optical fiber gyro during operation.

BACKGROUND OF THE INVENTION

An optical fiber gyro using an optical fiber which detects an angular velocity of a rotating member is widely used to control a car or vehicle body. In an optical fiber gyro using the phase modulation system, a light supplied from a light source is divided into two lights by an optical coupler, and the two lights are shifted in phase to be supplied to an optical fiber sensing loop by a phase modulator. Then, the lights which are propagated through the sensing loop in the clock and counter clock-wise directions are coupled to be supplied to an optical detector by the optical coupler, in which an electric signal is generated from the received light to detect an angular velocity of the sensing loop. Thus, a displacement angle of the optical fiber gyro is detected in accordance with the angular velocity.

In such an optical fiber gyro, if a malfunction occurs due to fault thereof, a system using the optical fiber gyro may be subject to an accident. Therefore, the earliest detection of the fault is required in the optical fiber gyro.

A conventional method for detecting fault of an optical fiber gyro comprises the steps of rotating the optical fiber gyro by a degree of 180, detecting an error between an input angular velocity and an output angular velocity, and detecting an extraordinary state of the optical fiber gyro in accordance with the detected error. When the extraordinary state is detected in the optical fiber gyro, the optical fiber gyro is disassembled, and an oscilloscope is used to check signals at respective nodes of the disassembled optical fiber gyro which is controlled to operate for the detection of fault. Consequently, the details of the fault are obtained from the observation of the signals in the oscilloscope.

In the conventional method for detecting fault of an optical fiber gyro, however, there are disadvantages in that the precise detection of fault is not expected, because the standard for detecting an extraordinary state is not clear, persons having no special skill in the art can not detect fault, because measuring instruments such as an oscilloscope are used, the fault is not detected during operation, because the optical fiber gyro is required to be disassembled, and a considerable time is required before the details of the fault are obtained, because signals are detected at the respective nodes of the disassembled optical fiber gyro.

Another conventional method for detecting fault of an optical fiber gyro is described in the Japanese Patent Kokai No. 63-128225. This method comprises the step of detecting an AC component of a signal for driving an optical modulator in an optical system. In this method, fault is detected in accordance with the AC component, and, for this purpose, a circuit for detecting the AC component comprises a plurality of synchronous detectors, and an adder for adding outputs of the synchronous detectors.

In the latter conventional method for detecting fault of an optical fiber gyro, however, there are disadvantages in that fault caused by the cutting-off or disconnection of a signal line and an extremely increased output in optical and electric systems are only detected, and false detection is resulted, when a high speed rotation is added to an optical fiber gyro.

SUMMARY OF THE INVENTION

Accordingly, it is an object of the invention to provide a method for detecting fault of an optical fiber gyro and an apparatus for diagnosing fault of an optical fiber gyro in which fault is precisely detected even by persons having no special skill in the art.

It is a further object of the invention to provide a method for detecting fault of an optical fiber gyro and an apparatus for diagnosing fault of an optical fiber gyro in which fault is detected during operation of the optical fiber gyro to provide the details thereof in a short time.

It is a still further object of the invention to provide a method for detecting fault of an optical fiber gyro and an apparatus for diagnosing fault of an optical fiber gyro in which fault other than the disconnection of a signal line and an extremely increased output is detected, and the false detection of fault is avoided.

According to the first feature of the invention, a method for detecting fault of an optical fiber gyro, comprises the steps of:

emitting a light from a light source to provide an emitted light;

modulating a phase of the emitted light to provide a phase-modulated light by a phase modulating signal;

propagating the phase-modulated light through an optical fiber sensing loop to provide a sensing loop propagated light;

receiving the sensing loop propagated light to provide an electric signal;

providing a fundamental wave component and even number harmonic wave components of the phase modulating signal by receiving the electric signal; and detecting the fault in an optical system in the optical fiber gyro in accordance with changes of the fundamental wave component and the even number harmonic wave components.

According to the second feature of the invention, an apparatus for diagnosing fault of an optical fiber gyro, comprises:

a light source for emitting a light;

a phase modulator for modulating a phase of the light to provide a phase-modulated light;

an optical fiber sensing loop for propagating the phase-modulated light to provide a sensing loop propagated light;

a photodetector for providing an electric signal by receiving the sensing loop propagated light;

a pre-amplifier for amplifying the electric signal to provide an amplified signal;

an integration circuit for integrating the amplified signal to provide an integrated signal; and a comparator for comparing the integrated signal with a fault reference voltage to provide a signal representing whether or not the fault is present in the optical fiber gyro.

BRIEF DESCRIPTION OF THE DRAWINGS

The invention will be explained in more detail in conjunction with appended drawings, wherein.

DESCRIPTION OF THE PREFERRED EMBODIMENTS

Figure 1:
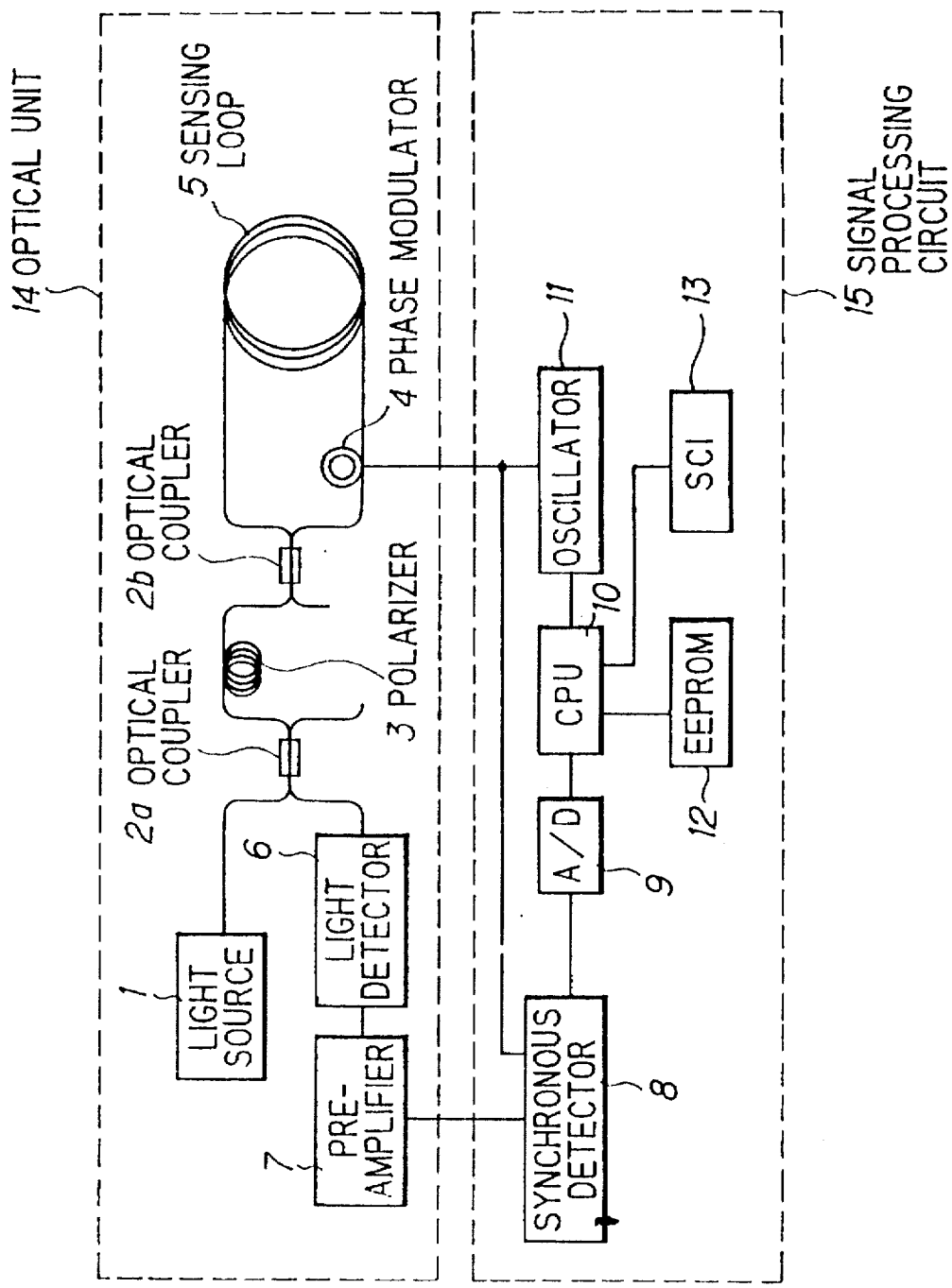
FIG. 1 is a block diagram showing an apparatus for diagnosing fault of an optical fiber gyro in a preferred embodiment according to the invention.

FIG. 1 shows an apparatus for diagnosing fault of an optical fiber gyro which comprises an optical unit 14 and a signal processing unit 15. The optical unit 14 comprises a light source 1 for emitting a light, an optical coupler 2a for coupling lights to provide a coupled light and decoupling a light to provide decoupled lights, a polarizer 3 for polarizing a light to provide a polarized light, an optical coupler 2b for dividing the polarized light into two lights, a phase modulator 4 for modulating lights in phase, an optical fiber sensing loop 5 for propagating the lights in the clock and counter clock-wise directions, a light detector 6 for detecting a light supplied from the optical coupler 2a, and a pre-amplifier 7 for amplifying an electric signal supplied from the light detector 6. The signal processing unit 15 comprises a synchronous detection circuit 8 for separating fundamental, duplicate and quadruple harmonic wave components S1, S2 and S4 of a phase modulated frequency used in the phase modulator 4, an analog to digital (A/D) converter 9 for converting the signals supplied from the synchronous detection circuit 8 from analog to digital, a CPU (central processing unit) 10 for calculating an angular velocity and fault information by receiving the digital signals from the A/D converter 9, an oscillator 11 for providing the phase modulator 4 with an oscillation signal in accordance with the control of the CPU 10, an EEPROM 12 for storing information of fault, and a SCI 13 for transferring the angular velocity and the fault information calculated in the CPU 10 to a host computer (not shown).

In operation, a light emitted from the light source 1 is branched by the optical coupler 2a, and one of the branched lights is polarized in the polarizer 3. A light polarized in the polarizer 3 is branched by the optical coupler 2b, and one of the branched lights is modulated in phase to be propagated through the sensing loop 5 in the counter clock-wise direction by the phase modulator 4, while the remaining one of the branched lights is propagated through the sensing loop 5 in the clock-wise direction, and then modulated in phase by the phase modulator 4. In the phase modulator 4, a sine-wave signal applied from the oscillator 11 generates a constant phase bias for the lights passed therethrough. The lights propagated through the sensing loop 5 are coupled by the optical coupler 2b, and the coupled light is supplied via the polarizer 3 and the optical coupler 2a to the light detector 6. When the sensing loop 5 is rotated to generate a rotative angular velocity, a phase difference occurs between the clock and counter clock-wise direction propagated lights, so that a light received by the light detector 6 changes dependent on the phase difference. The light detector 6 generates an electric signal which is then amplified in the pre-amplifier 7, and the amplified signal is detected in the synchronous detection circuit 8 to separate a fundamental wave component S1, a duplicate harmonic wave component S2, and a quadruple harmonic wave component S4 of a phase modulation frequency used in the phase modulator 4. The fundamental wave component S1, the duplicate harmonic wave component S2, and the quadruple harmonic wave component S4 are digitalized in the A/D converter 9 to be supplied to the CPU 10, in which an angular velocity and fault information are calculated to be supplied via the SCI 13 to the host computer.

In the calculation by the CPU 10, an angular velocity is obtained from a ratio of the fundamental and duplicate harmonic wave components S1 and S2 as defined by the equation (1).

$$\Omega = A \cdot \tan^{-1} \{J2(m)/J1(m) \cdot S1/S2\} \qquad (1)$$

where A is a scale factor, J1(m) and J2(m) are Bessel functions for the components S1 and S2, and m is a phase modulation degree.

J2(m)/J1(m) is calculated from J4(m)/J2(m) by having calculated the relations J4(m)/J2(m) and J2(m)/J1(m) in advance.

The relation is met between the duplicate and quadruple harmonic wave components S2 and S4 as defined by the equation (2).

$$S4/S2 = J4(m)/J2(m) \qquad (2)$$

Accordingly, J2(m)/J1(m) can be obtained by measuring the components S4/S2. Therefore, the angular velocity is obtained from the fundamental, and duplicate and quadruple harmonic wave components S1, S2 and S4.

A method for detecting fault of an optical fiber gyro in the invention will be explained in FIG. 2.

(1) detection of extraordinary state on zero points

An angular velocity of the sensing loop 5 is obtained on the basis of the above components in case where an angular velocity is zero by the equation (1). However, when the zero point of each component which is a reference signal shifts due to noise in an electric system, the angular velocity is not correctly calculated. In order to eliminate noise with high efficiency, a current supplied to the light source 1 is cut off to turn the light source 1 off by a light source on/off circuit (not shown), or the oscillator 11 is turned off to stop the phase modulation. Consequently, a light received in the light detector 6 has no connection with an angular velocity, regardless whether the optical fiber gyro is rotated or not. Each component of the received light is assumed to be a zero point, when the light source 1 is turned off, or the phase modulation stops. The zero points of the respective components are determined by sampling signals several times and calculating means values thereof, and, therefore, used as offset values to thereby eliminate noise. However, when noise is large, and the zero points are largely deviated, a range in which each component is detected becomes narrow. It is considered that the reason why the zero points are largely deviated is that a received light oscillates due to fault of the pre-amplifier 7, or the measurement of the zero points can not be carried out due to fault of the light source on/off circuit.

In view of the above, the state is determined to be extraordinary in regard to zero points, when the deviation of zero points is large.

Figure 2:
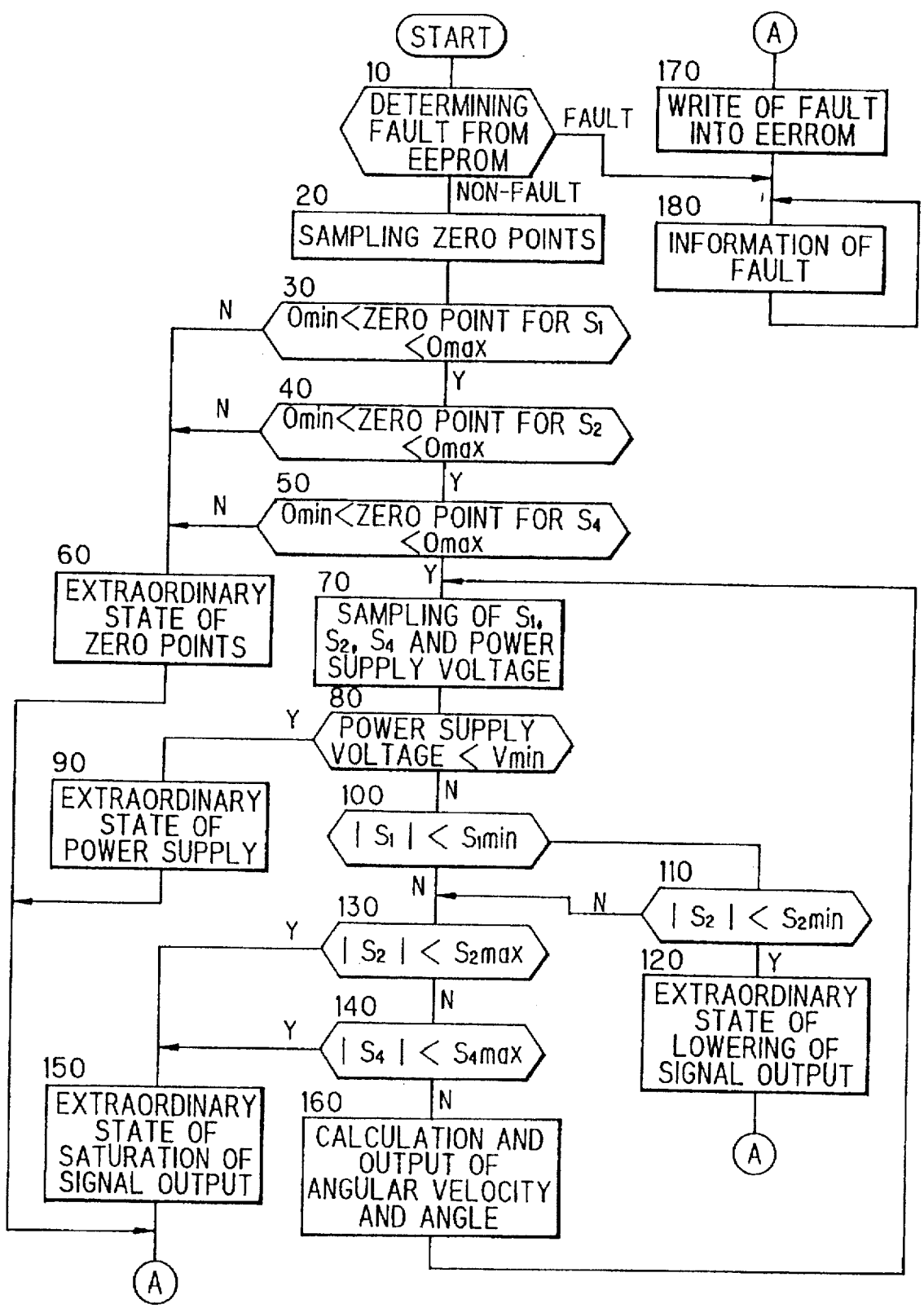
FIG. 2 is a flow chart showing operation in the preferred embodiment.

In the flow-chart as shown in FIG. 2, it is determined at the step 10 whether or not fault is found in accordance with contents of the EEPROM12.

At the step 20, the zero points are measured in accordance with output signals of the light detector 6.

At the steps 30, 40 and 50, the zero points of the respective components S1, S2 and S4 are checked to be inside a range between the minimum and maximum tolerable values $0_{min}$ and $0_{max}$ of zero points.

At the step 60, when at least one of the components S1, S2 and S4 is outside the range, it is determined that an extraordinary state is found on zero points.

In this detection of the extraordinary state on zero points, the minimum and maximum tolerable values are set in consideration of characteristics of the optical unit 14, the precision of the A/D converter 9, etc.

(2) detection of extraordinary state on output signals

Figure 3:
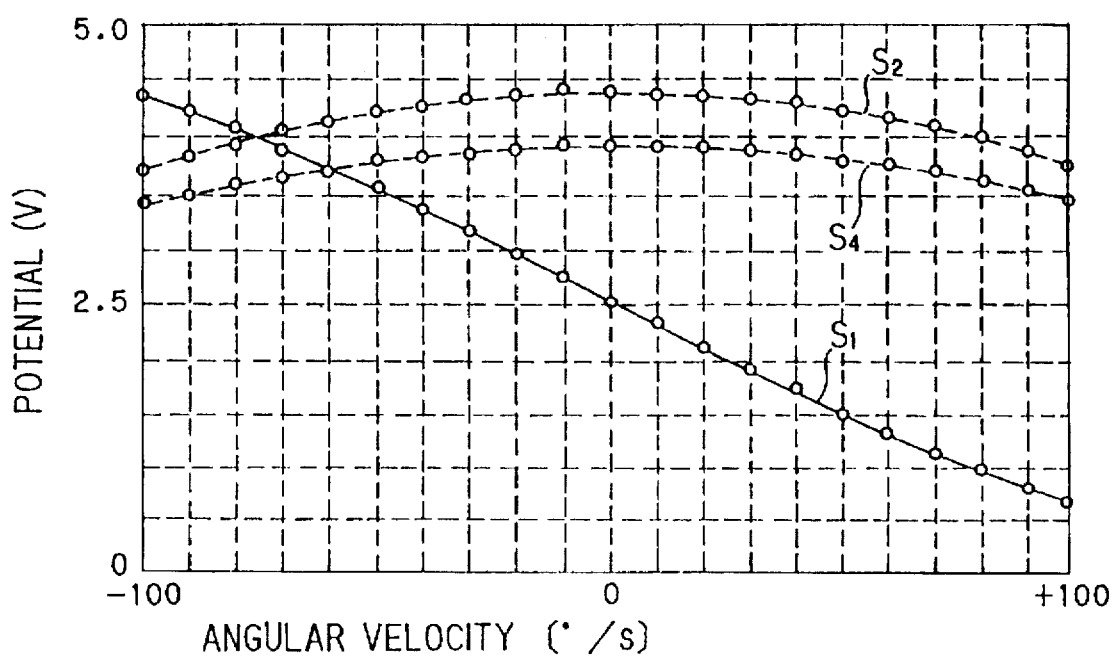
FIG. 3 is a graph showing potentials relative to angular velocities for fundamental, duplicate, and quadruple harmonic waves of detected signals in the preferred embodiment.

The fundamental, and duplicate and quadruple harmonic wave components S1, S2 and S4 are shown in FIG. 3. As clearly indicated therein, the fundamental wave component S1 decreases in proportion to the increase of an angular velocity of the sensing loop 5. On the other hand, the duplicate and quadruple harmonic wave components S2 and S4 are maximum in level at the angular velocity of zero, and decrease as an absolute value of the angular velocity increases. In FIG. 3, a level of 2.5 V is added to the respective components S1, S2 and S4, such that the zero point of the fundamental wave component S1 is in the central point of the graph.

At the step 70 in the flow chart as shown in FIG. 2, the respective components S1, S2 and S4 are measured in accordance with output signals of the light detector 6.

When it is detected that both of the components S1 and S2, or both of the components S1 and S4 are of a zero point(2.5V), it is determined that output signals are lowered due to fault such as the cutting-off or disconnection of an optical fiber for the sensing loop 5, etc.

At the steps 100 and 110, an absolute value of the component S1, and a level of the component S2 are checked. In this check, when the absolute value of the component S1 is less than a minimum tolerable value S1min, and the component S2 is less than a minimum tolerable value S2 min, it is determined at the step 120 that the extraordinary state has occurred due to the lowering of output signals.

As shown in FIG. 3, the components S2 and S4 are maximum at the angular velocity of zero. Therefore, when the components S2 and S4 are greater than predetermined maximum values S2 max and S4 max, respectively, at the steps 130 and 140, it is presumed that output signals are saturated due to fault of the pre-amplifier 7. Then, it is determined at the step 150 that the extraordinary state is caused by the saturation of the output signals.

(3) detection of extraordinary state in power supply

The extraordinary state of the lowering in level of the output signals is caused by fault in the optical unit 14 such as the cutting-off or disconnection of an optical fiber, the shortage of electric power from a power supply to the optical unit 14, etc. In order to detect the electric power shortage separately, the A/D converter 9 receives a signal of a voltage from an arbitrary nodal point supplied with a power supply voltage in the optical fiber gyro, and converts the received analog voltage signal to a digital voltage signal. The sampling of a power supply voltage is carried out at the step 70 where the aforementioned sampling of the component S1, S2 and S4 is carried out.

At the step 80, when a power supply voltage is detected to be lower than a predetermined minimum tolerable voltage $V_{min}$, it is determined at the step 90 that the power supply is under the extraordinary state. In this case, it is determined that the lowering in level of output signals is not caused by fault in the optical unit 14, but caused by the supply shortage of electric power to the optical unit 14. In the flow chart as shown in FIG. 2, the step 80 has a priority over the step 100 and the following steps, so that the lowering in level of output signals is not detected, when the power supply is detected to be under the extraordinary state.

(4) information of fault

As explained in the detections (1) to (3), when the extraordinary states of zero points, the lowering of output signals, the saturation of output signals, and a power supply are detected, the CPU 10 provides the external host computer with the information of the fault via the SCI 13 which is a communication medium at the step 180. Prior to the information of the fault to the external host computer, the fault is stored into the EEPROM 12 in which no information is unintentionally erased even under the turning-off of a power supply. When the power supply is turned on, the information of the fault is read from the EEPROM 12 to detect the state preceding the turning-on of the power supply, and the information thus read is also supplied via the SCI 13 to the external host computer.

When no fault is detected, the ordinary calculation of an angular velocity and an angle of the sensing loop 5 mounted on a rotative member is carried out at the step 160, and calculated results are supplied via the SCI 13 to the external host computer.

In this preferred embodiment, the above described calculation may be carried out in the external host computer which is supplied with the fundamental wave component S1, the duplicate harmonic wave component S2, and the quadruple harmonic wave component S4 of the phase modulation frequency, the zero points of the components S1, S2 and S4, and a power supply voltage.

Figure 4:
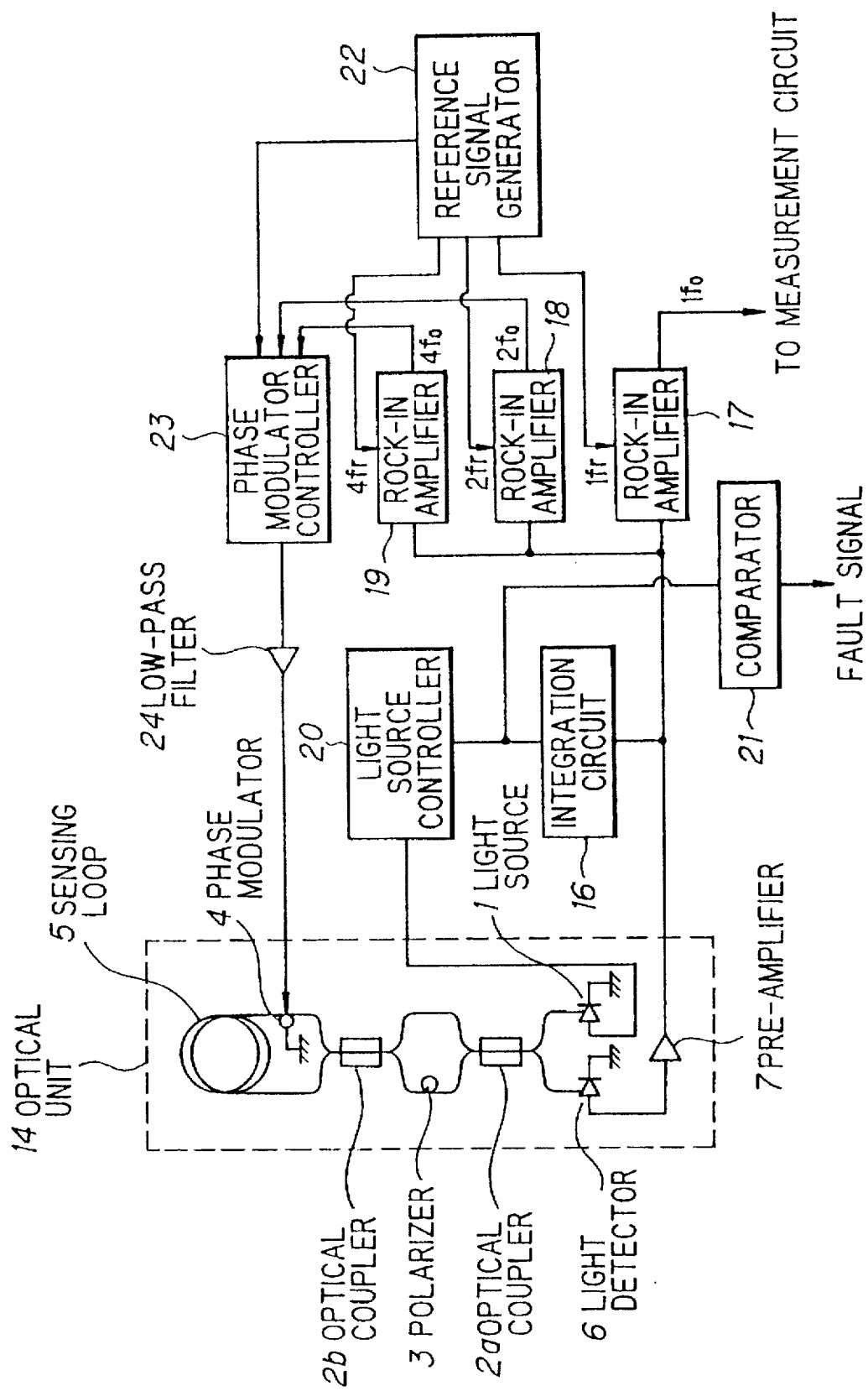
FIG. 4 is a block diagram showing an apparatus for diagnosing fault of an optical fiber gyro in a further preferred embodiment according to the invention.

FIG. 4 shows an apparatus for diagnosing fault of an optical fiber gyro in the further preferred embodiment according to the invention, wherein like parts are indicated by like reference numerals as used in FIG. 1.

The apparatus comprises the optical unit 14 which is the same as that shown in FIG. 1, and further comprises an integration circuit 16 for integrating only an AC signal, lock-in amplifiers 17, 18 and 19 for synchronous detection of the fundamental wave frequency 1 fo, the duplicate harmonic wave frequency 2 fo, and the quadruple harmonic wave frequency 4 fo, a light source controller 20 for controlling the light source 1, a comparator 21, a reference signal generator 22, a PZT controller (phase modulator driving circuit) 23 for controlling the phase modulator 4, and a low-pass filter 24.

In this apparatus, an A/D converter and a CPU are not used to lower a cost of a whole system, and enhance the reliability of the system by decreasing the number of parts and scaling an electronic circuit down.

Here, when it is assumed that a light output power is Po, a phase modulation degree is m, and a Sagnac phase difference is θ, a duplicate harmonic wave component S2 and a quadruple harmonic wave component S4 are obtained by the equations (3) and (4), and the Sagnac phase difference θ is defined by the equation (5).

$$S2 = Po \cdot J2(m) \cos \qquad (3)$$

$$S4 = Po \cdot J4(m) \cos \qquad (4)$$

$$\theta = \{4\pi Rl/(\lambda c)\} \cdot \qquad (5)$$

where R is a radius of the sensing loop 5, l is a length of the sensing loop 5, λ is a wavelength of a light from the light source 1, and c is a light velocity.

In accordance with the equations, the components S2 and S4 become low in level, as the angular velocity becomes large. Therefore, where the angular velocity is very large, there is a case where the diagnosis of fault can not be carried out. For this reason, when a system on which an optical fiber gyro is mounted operates to move, there is a case where fault can not be detected in the optical fiber gyro.

In order to overcome this drawback, an output signal of the pre-amplifier 7 is supplied to the integration circuit 16 for integrating only an AC signal separately, and to the lock-in amplifiers 17, 18 and 19, and an output signal of the integration circuit 16 is supplied to the light source controller 20 and the comparator 21. The light source controller 20 controls the light source 1 to emit an output light of a constant value by controlling a current injected into the light source 1, so that a value integrated in the integration circuit 16 is constant. In the lock-in amplifier 17 which is a synchronous detection circuit, a fundamental wave signal 1 fo is synchronously detected in accordance with a reference signal 1 fr supplied from the reference signal generator 22 by receiving the output signal of the pre-amplifier 7. The synchronously detected signal which is an analog gyro signal is supplied to a measurement circuit (not shown) in which an angular velocity is measured, or to a system using the optical fiber gyro. In the same manner, the duplicate harmonic wave signal 2 fo and the quadruple harmonic wave signal 4 fo are synchronously detected in the lock-in amplifiers 18 and 19 in accordance with reference signals 2 fr and 4 fr supplied from the reference signal generator 22 by receiving the output signal of the pre-amplifier 7, and the synchronously detected signals are supplied therefrom to the PZT controller 23.

The PZT controller 23 is a controller for controlling an amplitude of a modulating signal to make a modulating degree of the phase modulator 4 constant, and applies a modulating signal via the low-pass filter 24 to the phase modulator 4 by receiving the duplicate and quadruple harmonic waves 2 fo and 4 fo from the lock-in amplifiers 18 and 19, so that an amplitude of the reference signal from the reference signal generating circuit 22 is controlled to make a ratio of the two outputs 2 fo and 4 fo constant.

The comparator 21 detects fault in the optical fiber gyro by comparing an integration signal voltage of the integration circuit 16 with a predetermined reference voltage, and an output of the comparator 21 is a binary output signal having a level such as a TTL or CMOS level to represent an extraordinary state by using "L" and "H".

In the optical fiber gyro thus fabricated, an output P(t) of the pre-amplifier 7 is represented by the equation (6).

$$P(t) = K\{1 + V \cos(\phi_s + \phi_e \cos 2\pi f m t)\} \quad (6)$$

where K is a constant determined by a light output and an amplifying factor of an electronic circuit, V is a light interference efficiency, $\phi_s$ is Sagnac phase difference, $\phi_e$ is a phase modulating degree, and fm is a phase modulating frequency.

The Sagnac phase difference $\phi_s$ is represented by the equation (7)

$$\phi_s = \alpha \Omega = (4 Rl/\lambda c) \quad (7)$$

where a is a scale factor, R is a radius of a sensing loop, l is a length of the sensing loop, $\lambda$ is a wavelength of a light source, c is a light velocity, and $\Omega$ is an angular velocity.

The equation (6) is converted to the equation (8).

$$P(t) = K\left(1 + V \cdot \cos\phi_s \cdot \left\{J_0(\phi_e) + 2\sum_{n=1}^{\infty}(-1)^n J_{2n}(\phi_e) \cdot \cos(2n \cdot 2\pi f m t)\right\} - V \cdot \sin\phi_s \cdot \left\{2\sum_{n=0}^{\infty}(-1)^n J_{2n+1}(\phi_e) \cdot \cos((2n+1) \cdot 2\pi f m t)\right\}\right) \quad (8)$$

In the equation (8), values of the terms of more than 7th order in the Bessel function are generally small to be negligible as zero. In the further preferred embodiment, P'(t) which is obtained by excluding a DC component from P(t) is calculated by the equation (9), because the integration circuit 16 is used to integrate only an AC signal $$\begin{aligned}
P'(t) = &-2KVJ_1(\phi_e) \cdot \sin\phi_s \cdot \cos(2\pi f m t) - \\
&2KVJ_2(\phi_e) \cdot \cos\phi_s \cdot \cos(2\pi 2 f m t) + \\
&2KVJ_3(\phi_e) \cdot \sin\phi_s \cdot \cos(2\pi 3 f m t) + \\
&2KVJ_4(\phi_e) \cdot \cos\phi_s \cdot \cos(2\pi 4 f m t) - \\
&2KVJ_5(\phi_e) \cdot \sin\phi_s \cdot \cos(2\pi 5 f m t) - \\
&2KVJ_6(\phi_e) \cdot \cos\phi_s \cdot \cos(2\pi 6 f m t)
\end{aligned} \quad (9)$$

The level of the AC signal of the pre-amplifier 7 is calculated by integrating the signal P'(t) in the integration circuit 16. The effective value thereof is defined by the equation (10).

$$|P| = \sqrt{\frac{1}{T}\int_0^T P'^2(t) dt} \quad (10)$$

where T is a period of the fundamental wave signal.

Here, if it is assumed that $2\pi f \, mt$ is $\omega t$, $$\begin{aligned}
P'^2(t) = &\; 4K^2V^2\{-J_1(\phi e) \cdot \sin\phi_s \cdot \cos(\omega t) - \\
&J_2(\phi e) \cdot \cos\phi_s \cdot \cos(2\omega t) + J_3(\phi e) \cdot \sin\phi_s \cdot \cos(3\omega t) + \\
&J_4(\phi e) \cdot \cos\phi_s \cdot \cos(4\omega t) - J_5(\phi e) \cdot \sin\phi_s \cdot \cos(5\omega t) - \\
&J_6(\phi e) \cdot \cos\phi_s \cdot \cos(6\omega t)\}^2 \\
= &\; 4K^2V^2 \times \\
&[\{J_1^2(\phi e) \cdot \sin^2\phi_s \cdot \cos^2(\omega t) + \\
&J_2^2(\phi e) \cdot \cos^2\phi_s \cdot \cos^2(2\omega t) + \ldots\} \\
&-2J_1(\phi e) \cdot \cos\phi_s \cdot \cos(2t) \times \\
&\{-J_2(\phi e) \cdot \cos\phi_s \cdot \cos(2\omega t) + \\
&J_3(\phi e) \cdot \sin\phi_s \cdot \cos(3\omega t) + \ldots\} \\
&-2J_2(\phi e) \cdot \cos\phi_s \cdot \cos(2\omega t) \times \\
&\{J_3(\phi e) \cdot \sin\phi_s \cdot \cos(3\omega t) + \\
&J_4(\phi e) \cdot \cos\phi_s \cdot \cos(4\omega t) + \ldots\} \\
&2J_3(\phi e) \cdot \sin\phi_s \cdot \cos(3\omega t) \times \\
&\{J_4(\phi e) \cdot \cos\phi_s \cdot \cos(4\omega t) - \\
&J_5(\phi e) \cdot \sin\phi_s \cdot \cos(5\omega t) - \ldots\} \\
&+2J_4(\phi e) \cdot \cos\phi_s \cdot \cos(4\omega t) \times \\
&\{-J_5(\phi e) \cdot \sin\phi_s \cdot \cos(5\omega t) - \\
&J_6(\phi e) \cdot \cos\phi_s \cdot \cos(6\omega t)\} - \\
&2J_5(\phi e) \cdot \sin\phi_s \cdot \cos(5\omega t) \times \\
&\{-J_6(\phi e) \cdot \cos\phi_s \cdot \cos(6\omega t)\}]
\end{aligned} \quad (11)$$

In the equation (11), the terms of "$\cos^2$" and the other terms are separately integrated.

$$\frac{1}{T}\int_0^T J_1^2(\phi e) \cdot \sin^2\phi s \cdot \cos^2 wt\, dt = \tag{12}$$

$$\frac{J_1^2(\phi e) \cdot \sin^2\phi s}{2T}\int_0^T (1+\cos 2wt)dt = \frac{J_1^2(\phi e) \cdot \sin^2\phi s}{2}$$

$$\frac{1}{T}\int_0^T 2J_1(\phi e) \cdot J_2(\phi e) \cdot \sin\phi s \cdot \cos\phi s \cdot \cos wt \cdot \cos 2wt\, dt = \tag{13}$$

$$\frac{J_1(\phi e) \cdot J_2(\phi e) \cdot \sin\phi s \cdot \cos\phi s}{T}\int_0^T (\cos 3wt + \cos wt)dt = 0$$

For instance, when the phase modulating degree $\phi e$ is 2.7,
$J_1(\phi e)=0.4416$
$J_2(\phi e)=0.46956$
$J_3(\phi e)=0.25405$
$J_4(\phi e)=0.09498$
$J_5(\phi e)=0.02789$
$J_6(\phi e)=0.00645$
Therefore, the equation (14) is obtained as defined below.

$$|P| = 2kv\sqrt{0.13015 \cdot \sin^2\phi s + 0.11477 \cdot \cos^2\phi s} \tag{14}$$

Figure 5:
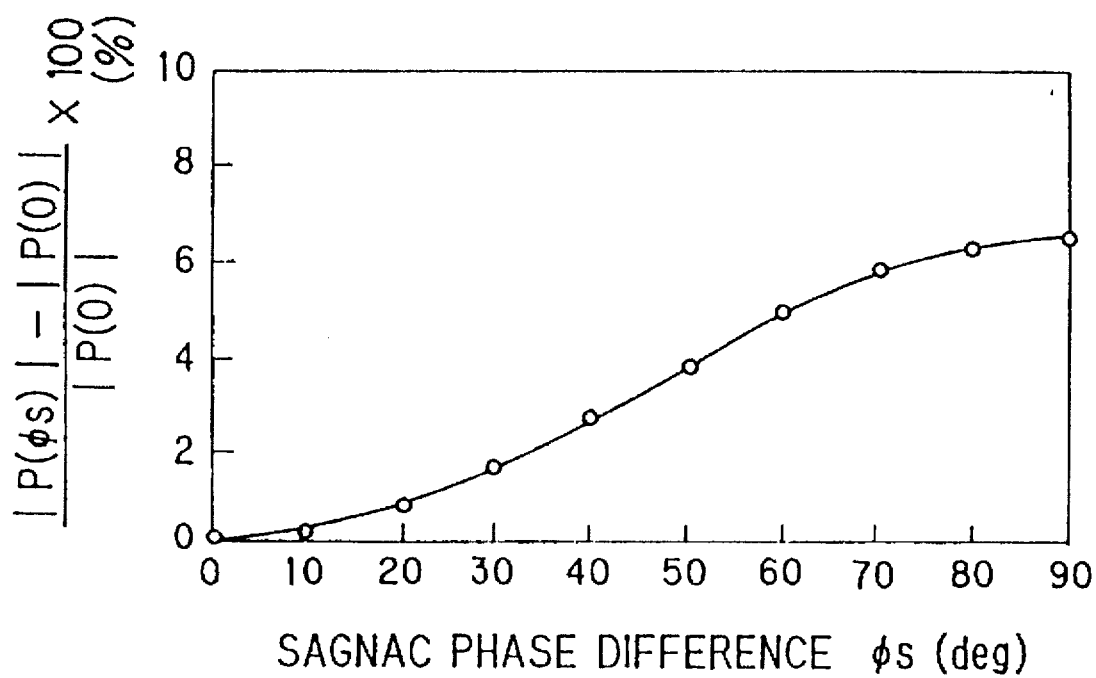
FIG. 5 is a graph showing an output signal relative to a Sagnac phase difference in the further preferred embodiment.

FIG. 5 shows the changing amount of the output $|P(\phi S)|$ of the integration circuit 16 at the Sagnac phase difference $\phi s$, where the output $|P(0)|$ at the Sagnac phase difference $\phi(s)$ of zero, that is, at the angular velocity $\Omega$ of zero is a reference value on condition that no rotation is applied to the optical fiber gyro. As shown therein along the vertical axis, the changing amount is obtained by a percentage of $\{(|P(\phi)|-|P(0)|)/|P(0)|\}\times 100$.

In the graph as shown in FIG. 5, the changing amount is gradually increased from 0% to 6%, when the Sagnac phase difference $\phi s$ changes from 0° to 90°. In ordinary optical fiber gyros, a dynamic range of an angular velocity is usually designed for the Sagnac phase difference $\phi s$ to be equal to or less than 60° ($|\phi s|\leq 60°$). In this dynamic range, the changing amount is less than 5% in FIG. 5. Therefore, even if an ordinary rotative angular velocity is applied to an optical fiber gyro, the changing amount in the outputs of the integration circuit 16 will be less than 5%.

When an extraordinary state is found in the constant k which is determined by a light output and an amplification factor of an electronic circuit due to fault of an optical or electronic system, or when an extraordinary state is found in the light interference efficiency V due to deterioration in a polarization maintaining optical fiber used for an optical system, the output $|P(\phi s)|$ is a effected by the extraordinary state. Even in such a case, the changing amount is less than 5%. Therefore, when the changing amount of more than 10% is found, the extraordinary state is detected to be fault in the optical or electronic system.

In the comparator 21, a value which is approximately 10% of the output $|P(0)|$ is set as a fault reference value. Consequently, an extraordinary state is detected with a precision of at least ±10% even where an ordinary rotative angular velocity is applied to the optical fiber gyro. An output level of a fault signal supplied from the comparator 21 is a TTL or CMOS level, as described before. Therefore, the comparator 21 is easily connected to a system using an optical fiber gyro, so that the system detects fault of the optical fiber gyro in accordance with the detection of the fault signal. When the fault occurs in the optical fiber gyro, an overcurrent flours through the light source 1 in most cases. Therefore, it is preferable for the light source 1 to be turned off, when the fault signal is detected.

In the further preferred embodiment, a photodiode may be provided on an opposite side to the optical fiber coupled to the light source 1, so that an output light of the light source 1 is controlled by an output signal of the photodiode in place of an output signal of the integration circuit 16.

In accordance with invention, following advantages are expected to be obtained.

(1) An accident can be precisely avoided, because the fault detection is carried out in an optical fiber gyro during operation.

(2) Detailed information of fault is obtained to locate a position of the fault and to clarify causes of the fault.

(3) The fault information is not erased, even if a power supply is turned off, because it is stored in a non-volatile memory (EEPROM). Therefore, even if the power supply is instantly turned off in accordance with the fault detection, the fault information is not erased, and is successively supplied to a host machine.

(4) A circuit is simplified, an optical fiber gyro is made small in size and low in cost, and the number of parts is decreased to enhance the reliability, because fault is detected by a value obtained in an integration circuit receiving an amplified signal supplied from a pre-amplifier.

(5) A precision in determining fault is high, because an output of an integration circuit is constant in principle, even if a rotative angular velocity is applied to an optical fiber gyro.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A method for detecting fault of an optical fiber gyro, comprising the steps of:

emitting a light from a light source to provide an emitted light;

modulating a phase of said emitted light to provide a phase-modulated light by a phase modulating signal;

propagating said phase-modulated light through an optical fiber sensing loop to provide a sensing loop propagated light;

receiving said sensing loop propagated light to provide an electric signal;

providing a fundamental wave component and even number harmonic wave components of said phase modulating signal by receiving said electric signal; and detecting said fault in an optical system in said optical fiber gyro in dependence on whether or not respective changes of said fundamental wave component and said even number harmonic components are below respective predetermined levels.

2. A method for detecting fault of an optical fiber gyro, according to claim 1, further comprising the steps of:

storing information of said fault into a non-volatile memory;

supplying said information to an external system, when said information is stored in said non-volatile memory; and reading said information from said non-volatile memory, when a power supply for said optical system is turned from off to on; and supplying said information read therefrom to said external system.

3. A method for detecting fault of an optical fiber gyro, comprising the steps of:

emitting a light from a light source to provide an emitted light;

modulating a phase of said emitted light to provide a phase-modulated light by a phase modulating signal;

propagating said phase-modulated light through an optical fiber sensing loop to provide a sensing loop propagated light;

receiving said sensing loop propagated light to provide an electric signal;

providing a fundamental wave component and even number harmonic wave components of said phase modulating signal by receiving said electric signal;

detecting said fault in an optical system in said optical fiber gyro in accordance with changes of said fundamental wave component and said even number harmonic wave components;

turning said light source off in said optical system;

detecting a noise component of said electric signal, when said light source is turned off; and detecting said fault in an electric system in said optical fiber gyro in accordance with a level of said noise component.

4. A method for detecting fault of an optical fiber gyro, according to claim 3, further comprising the steps of:

storing information of said fault into a non-volatile memory;

supplying said information to an external system, when said information is stored in said non-volatile memory; and reading said information from said non-volatile memory, when a power supply for said optical system is turned from off to on; and supplying said information read therefrom to said external system.

5. A method for detecting fault of an optical fiber gyro, comprising the steps of:

emitting a light from a light source to provide an emitted light;

modulating a phase of said emitted light to provide a phase-modulated light by a phase modulating signal;

propagating said phase-modulated light through an optical fiber sensing loop to provide a sensing loop propagated light;

receiving said sensing loop propagated light to provide an electric signal;

providing a fundamental wave component and even number harmonic wave components of said phase modulating signal by receiving said electric signal;

detecting said fault in an optical system in said optical fiber gyro in accordance with changes of said fundamental wave component and said even number harmonic wave components;

stopping phase-modulation of said emitted light;

detecting a noise component of said electric signal, when said phase-modulation of said emitted light is stopped; and detecting said fault in an electric system in said optical fiber gyro in accordance with a level of said noise component.

6. A method for detecting fault of an optical fiber gyro, according to claim 5, further comprising the steps of:

storing information of said fault into a non-volatile memory;

supplying said information to an external system, when said information is stored in said non-volatile memory; and reading said information from said non-volatile memory, when a power supply for said optical system is turned from off to on; and supplying said information read therefrom to said external system.

7. A method for detecting fault of an optical fiber gyro, comprising the steps of:

emitting a light from a light source to provide an emitted light;

modulating a phase of said emitted light to provide a phase-modulated light by a phase modulating signal;

propagating said phase-modulated light through an optical fiber sensing loop to provide a sensing loop propagated light;

receiving said sensing loop propagated light to provide an electric signal;

providing a fundamental wave component and even number harmonic wave components of said phase modulating signal by receiving said electric signal;

detecting said fault in an optical system in said optical fiber gyro in accordance with changes of said fundamental wave component and said even number harmonic wave components;

measuring a power supply voltage applied to said optical fiber gyro;

detecting said fault in power supply in accordance with a level of said power supply voltage; and separating said fault in said power supply and said fault in said optical system.

8. An apparatus for diagnosing fault of an optical fiber gyro, comprising:

a light source for emitting a light;

a phase modulator for modulating a phase of said light to provide a phase modulated light;

an optical fiber sensing loop for propagating said phase modulated light to provide a sensing loop propagated light;

a photodetector for providing an electric signal by receiving said sensing loop propagated light;

a pre-amplifier for amplifying said electric signal to provide an amplified signal;

an integration circuit for integrating said amplified signal to provide an integrated signal; and a comparator for comparing said integrated signal with a fault reference voltage to provide a signal representing whether or not said fault is present in said optical fiber gyro, wherein said phase modulator is controlled in accordance with a control signal obtained by synchronously detecting said amplified signal on a feed-back line, said feed-back line making constant a phase modulating degree of said phase modulated light; and said integration circuit is positioned outside said feed-back line.

9. An apparatus for diagnosing fault of an optical fiber gyro, according to claim 8, further comprising:

a light output controller for controlling said light source to emit a light having a constant light output.

10. An apparatus for diagnosing fault of an optical fiber gyro, according to claim 8, further comprising:

a controller for controlling said phase modulator to modulate said light emitted from said light source by a constant modulating degree.

11. An apparatus for diagnosing fault of an optical fiber gyro, according to claim 8, further comprising a synchronous detection circuit coupled to said pre-amplifier, said amplified signal being a signal prior to synchronous detection by said synchronous detection circuit.

12. An apparatus for diagnosing fault of an optical fiber gyro, according to claim 11, further comprising:

a light output controller for controlling said light source to emit a light having a constant light output.

13. An apparatus for diagnosing fault of an optical fiber gyro, according to claim 11, further comprising:

a controller for controlling said phase modulator to modulate said light emitted from said light source by a constant modulating degree.

14. An apparatus for diagnosing fault of an optical fiber gyro, comprising:

a light source for emitting a light;

a phase modulator for modulating a phase of said light to provide a phase modulated light by a phase modulating signal;

an optical fiber sensing loop for propagating said phase modulated light to provide a sensing loop propagated light;

a photodetector for providing an electric signal by receiving said sensing loop propagated light;

a pre-amplifier for amplifying said electric signal to provide an amplified signal; and a signal processing circuit for detecting a fundamental wave component and even number harmonic wave components of said phase modulating signal, and diagnosing said fault in an optical system in said optical fiber gyro in dependence on whether or not respective changes of said fundamental wave component and said even number harmonic wave component are below respective predetermined levels.

* * * * *